United States Patent [19]
Myles

[11] Patent Number: 6,012,766
[45] Date of Patent: Jan. 11, 2000

[54] VEHICLE BODY WITH COVERED RECESSED SEAMS

[75] Inventor: Dennis Myles, Bloomfield, Mich.

[73] Assignee: Chrysler Corporation, Auburn Hills, Mich.

[21] Appl. No.: 08/997,638

[22] Filed: Dec. 23, 1997

[51] Int. Cl.[7] ................................................. B62D 25/00
[52] U.S. Cl. ...................... 296/203.03; 296/210; 296/213
[58] Field of Search ................................. 296/210, 213, 296/193, 203.03, 203.01; 224/326, 327, 329

[56] References Cited

U.S. PATENT DOCUMENTS

| | | | |
|---|---|---|---|
| 4,304,435 | 12/1981 | Everts et al. ............................. | 296/213 |
| 4,417,762 | 11/1983 | Imai et al. ............................... | 296/210 |
| 4,518,197 | 5/1985 | Gallitzendörfer et al. ............. | 296/213 |
| 4,575,147 | 3/1986 | Ui et al. ................................ | 296/213 X |
| 4,618,181 | 10/1986 | Tokuda et al. .......................... | 296/191 |
| 4,684,048 | 8/1987 | Bott ........................................ | 224/326 |
| 4,723,696 | 2/1988 | Stichweh et al. ....................... | 224/331 |
| 4,754,905 | 7/1988 | Bott ........................................ | 224/326 |
| 4,792,180 | 12/1988 | Jacobsen et al. ....................... | 296/210 |
| 4,834,448 | 5/1989 | Sakamoto et al. ...................... | 296/210 |
| 4,883,310 | 11/1989 | Miyazaki et al. ....................... | 296/210 |
| 4,899,917 | 2/1990 | Bott ........................................ | 224/326 |
| 4,930,279 | 6/1990 | Bart et al. . | |
| 5,013,083 | 5/1991 | Yada et al. .............................. | 296/213 |
| 5,090,605 | 2/1992 | Cucheran ................................ | 224/321 |
| 5,413,398 | 5/1995 | Kim ........................................ | 296/210 |
| 5,575,527 | 11/1996 | Pfister .................................... | 296/213 |
| 5,732,865 | 3/1998 | Cucheran et al. ..................... | 224/326 X |

FOREIGN PATENT DOCUMENTS

| | | | |
|---|---|---|---|
| 0411988 | 2/1991 | European Pat. Off. ............... | 224/329 |
| 2690117 | 10/1993 | France ................................... | 224/329 |
| 2931929 | 2/1981 | Germany ............................... | 224/329 |
| 2933718 | 3/1981 | Germany ............................... | 224/329 |
| 3032099 | 4/1982 | Germany ............................... | 224/329 |
| 4320794 | 1/1994 | Germany ............................... | 224/329 |
| 0149866 | 9/1983 | Japan ..................................... | 296/210 |
| 404063773 | 2/1992 | Japan ..................................... | 296/210 |

*Primary Examiner*—Dennis H. Pedder
*Attorney, Agent, or Firm*—Roland A. Fuller III

[57] ABSTRACT

A passenger vehicle is provided with a vehicle body including a roof panel and a body side panel. The roof panel and the body side panel are attached to one another along an attachment seam. The roof panel and body side panel combine to form a recessed channel along opposite sides of the attachment seam. An elongated trim member is received within said channel, overlying a portion of the attachment seam between the roof panel and the body side panel. The body side panels extend from a windshield of the vehicle to a rear of the vehicle body including a door surround portion integrally formed as a unitary member with a rear quarter portion of the vehicle body.

5 Claims, 2 Drawing Sheets

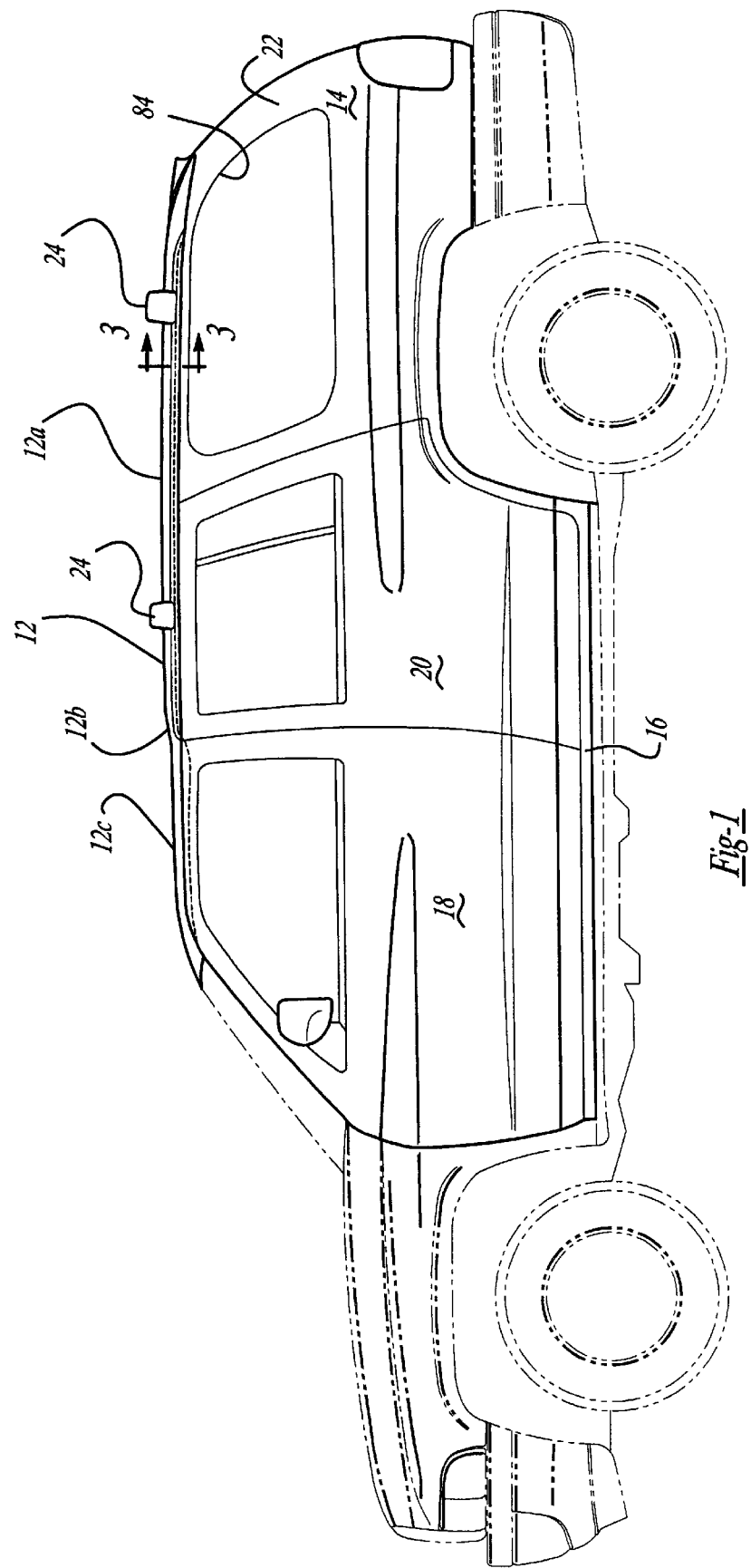

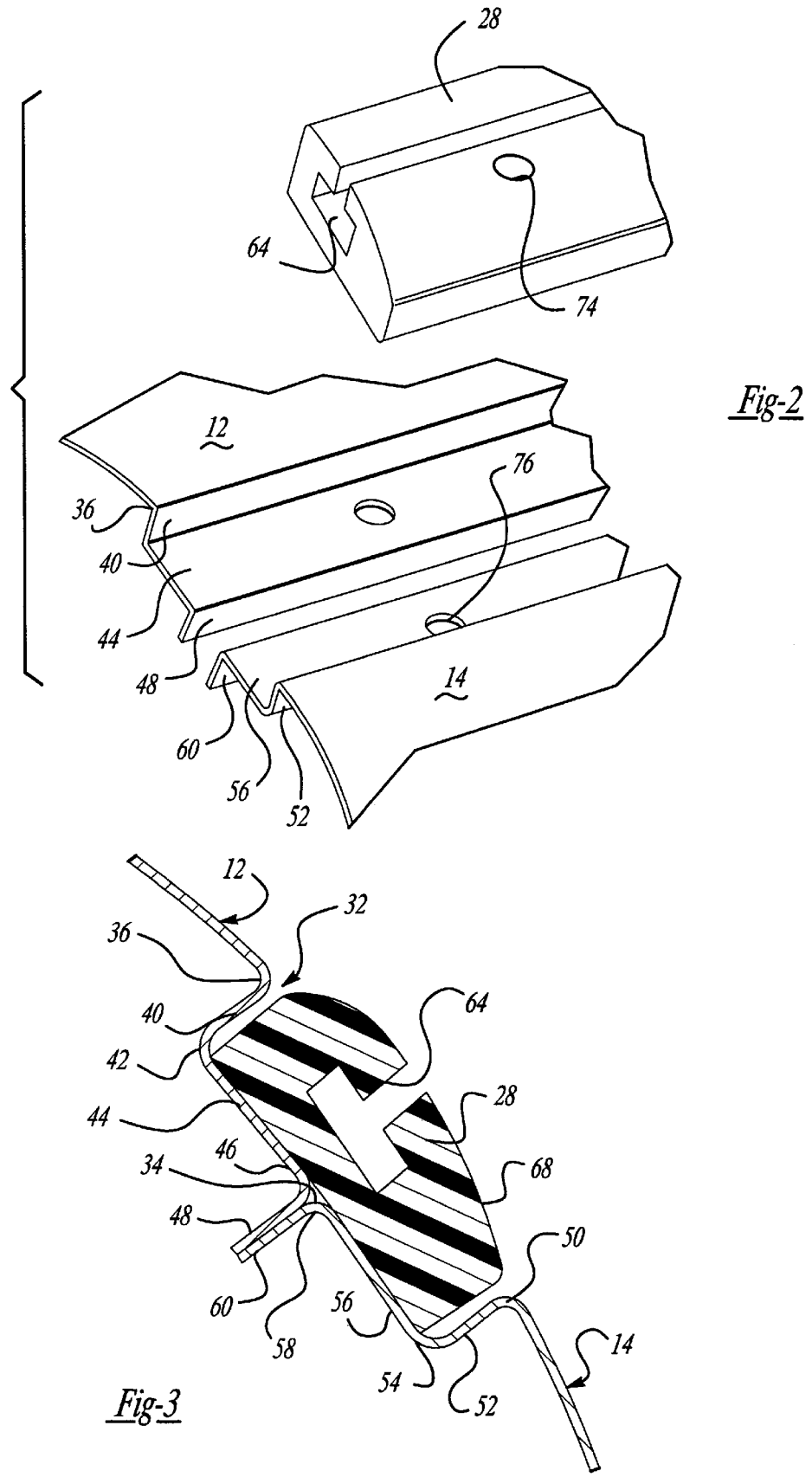

VEHICLE BODY WITH COVERED RECESSED SEAMS

FIELD OF THE INVENTION

The present invention relates to an automotive vehicle body, and more particularly, to a vehicle body with covered recessed seams.

BACKGROUND AND SUMMARY OF THE INVENTION

Vehicle body panels have been mounted to a vehicle in many ways. Body panels are typically fastened to the vehicle frame or to one another via fasteners or by welding. When body panels are welded together, a weld seam extends along the line of connection between the body panels. Typically, if this weld seam is provided along an exterior, exposed surface, the weld seam must be polished down flush with the body panels in order to provide a smooth, aesthetically pleasing body finish. Typically, the polishing process used for smoothing out the weld seam is both time consuming and expensive whether done by manual laborers or by computerized machinery. Accordingly, it is desirable to provide a method by which the weld seam between body panels is not required to be polished down to a smooth surface, thereby avoiding the time and expense associated with such a polishing process.

A vehicle body is generally made up of numerous body panels which are attached to the vehicle frame and/or to one another. Typically, a vehicle body includes a pair of front quarter panels, a pair of door surround panels, a pair of rear quarter panels, a roof panel, door panels (including a rear door or tailgate, if applicable), and a hood for the engine compartment and trunk (if applicable). Each of these panels is required to be connected to the vehicle frame and/or to one another. Slight variations in the dimensions of each of these panels which may occur during manufacturing, may result in reduced dimensional control for the door and window opening and may reduce the quality of the fit and finish of the vehicle body. Accordingly, it is an object of the present invention to provide a vehicle body design which provides excellent dimensional control for the door and window opening and thereby ensures good door and window sealing.

According to one aspect of the present invention, a passenger vehicle is provided with a vehicle body including a roof panel and a body side panel. The roof panel and the body side panel are attached to one another along an attachment seam. The roof panel and body side panel combine to form a recessed channel. An elongated trim member is received within said channel, overlying at least a portion of the attachment seam between the roof panel and the body side panel. According to this aspect of the present invention, a method is provided for eliminating the requirement of polishing a weld seam between the roof panel and the body side panel of a vehicle.

According to yet another aspect of the present invention, a passenger vehicle is provided with a vehicle body including a roof panel and a pair of body side panels. The body side panels extend from a windshield of the vehicle to a rear of the vehicle body including a door surround portion integrally formed as a unitary member with a rear quarter portion of the vehicle body. The pair of body side panels are attached to the roof panel on opposite sides thereof. A portion of a seam between the roof panel and the body side panels is covered by a pair of elongated trim members. The pair of elongated trim members include a guide channel for mounting a roof rack bracket. The side edges of a portion of the roof panel and the upper edges of a portion of the body side panels define a recessed channel for receipt of the elongated trim member such that the upper surface of the elongated trim members is generally flush with the roof panel and adjacent body side panel. Another portion of the connection seam between the roof panel and the side panels is covered by the window frame of at least one of the side doors of the vehicle.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 1 is side view of a vehicle having a body with covered recessed seams, according to the principles of the present invention;

FIG. 2 is an exploded perspective view of the roof panel and body side panel interface portions which define a recessed channel for receipt of an elongated trim member which covers the connection seam between the roof panel and body side panel according to the principles of the present invention; and FIG. 3 is a cross-sectional view taken along line 3—3 of FIG. 1, illustrating the covered recessed seams between the vehicle roof panel and body side panel according to the principles of the present invention.

DETAILED DESCRIPTION OF THE PREFERRED EMBODIMENTS

With reference to FIGS. 1–3, the present invention will now be described. FIG. 1 shows a vehicle 10 having a body including a roof panel 12 and a unitary body side panel 14 which includes a door surround portion 16 disposed around front side door 18 and rear side door 20. Unitary body side panel 14 also includes a rear quarter portion 22 integrally formed with the door surround portion as a unitary member. A roof luggage rack is provided with movable cross bars 24. Cross bars 24 are provided with stanchions that support the cross bars and engage with elongated trim members 28. The trim members 28 nestle in a recessed channel 32 created along the roof panel to body side panel connection (weld) seam 34.

Roof panel 12 is provided with a first elongated inward bend 36 which forms a recessed sidewall portion 40 and a second elongated bend portion 42 which forms base wall portion 44 for the recessed channel 32. The roof panel 12 includes a third elongated bend portion 46 which forms a weld flange 48 which extends generally perpendicular to the base wall portion 44.

Similarly, body side panel 14 includes a first elongated bend portion 50 which defines a recess side wall portion 52. A second elongated bend portion 54 is provided in the recess side wall portion 52 in order to define a second recess base wall portion 56. A third elongated bend portion 58 is provided in the recess base wall portion 56 to define a weld flange 60. Weld flanges 48 and 60 of roof panel 12 and body side panel 14, respectively, are welded (or otherwise fastened) to one another according to standard welding or other attachment methods as known in the art. It should be noted that although the roof panel 12 and body side panel 14 are shown with weld flanges 48 and 60 for attaching the panels to one another, other welding techniques may be utilized such as by overlapping the base wall portions 44 and 56 of the panels 12, 14 and welding the portions together in an overlapped fashion.

Elongated trim members 28 include a roof rack guide channel 64 which is engaged by the stanchions which support the cross bar 24. Because of the generally vertical support provided for the trim members 28 by the generally vertical body side panels 14, this location along the vehicle roof is very strong, allowing the roof rack to carry substantial loads (approximately 150 pounds) thereon.

The recessed channel 32 and the outer surface of the elongated trim member 28 can be provided such that the outer surface 68 of the elongated trim member 28 is generally flush with the outer surfaces of the body side panel 14 and roof panel 12. The trim members 28 can be provided with fastener holes 74 and either of the roof panel 12 and body side panel 14 can be provided with corresponding fastener holes 76 for receiving fasteners (not shown) for mounting the elongated trim members 28 to the body panels 12, 14.

According to the present invention, the elongated trim members 28 provide a dual function in providing a cover for the recessed seam 34 between the roof panel 12 and body side panel 14. In addition, trim members 28 serve as guide channels for supporting the roof rack cross members 24.

The unitary body side panels 14 which extend from the windshield pillars to the liftgate pillars provide excellent dimensional control for the door and quarter window openings. The excellent dimensional control provides high quality fit and finish for the vehicle body. The unitary body side panels 14 form the door opening and the outer skin aft of the doors 18, 20 including the rear quarter portion 22 having quarter window openings 84. In contrast with typical vehicle body designs, which use multiple piece constructions, the excellent dimensional control that is achieved with the one-piece construction reduces the number of assembly steps required as well as providing high quality fit and finish as discussed above. Through controlling the door openings, this construction also helps ensure good door sealing.

The weld seam 34 between the roof panel 12 and the unitary body side panel 14 is covered in part by the window frame of the front side door 18 and by the elongated trim member 28 as discussed above.

Roof panel 12 includes a raised rearward roof portion 12a which provides increased headroom for passengers in the rear of the vehicle. An intermediate transition portion 12b provides a hump between a forward roof portion 12c and the raised rearward roof portion 12a. The transverse line of demarcation between the raised rearward roof portion 12a and the forward roof portion 12c is approximately along the rearward edge of the front seats of the vehicle. The elongated trim members 28 extend generally along the entire length of the raised rearward roof portion 12a. Elongated trim members 28 serve to optically camouflage the raised rearward roof portion 12a.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A passenger vehicle, comprising:
    a vehicle body including a roof and a pair of body side sections, said body side sections extending from a windshield to a rear of said vehicle body, said pair of body side sections being attached to said roof on opposite sides thereof; and
    a pair of elongated trim members each overlying a first portion of a seam between said roof and one of said body side sections;
    wherein a first side edge of a portion of said roof and an upper edge of at least a portion of a first one of said pair of body side sections define a first recessed channel and a second side edge of a portion of said roof and an upper edge of at least a portion of a second one of said pair of body side sections define a second recessed channel, each of said elongated trim members being disposed in a respective one of said first and second recessed channels, wherein a second portion of said seam between said roof and one of said body side sections is covered by a window frame of at least one side door of the vehicle.

2. The passenger vehicle according to claim 1, wherein said pair of elongated trim members include a guide channel for mounting a roof rack bracket.

3. The passenger vehicle according to claim 1, wherein said pair of elongated trim members include a guide channel for adjustably mounting a roof rack bracket.

4. A passenger vehicle, comprising:
    a vehicle body including a roof panel and a pair of body side panels, said body side panels extending from a windshield of the vehicle to a rear of the vehicle body including a door surround portion integrally formed as a unitary member with a rear quarter portion of the vehicle body, a first of said pair of body side panels being attached to said roof panel on one side and a second of said pair of body side panels is attached to said roof panel on an opposite side thereof, said roof panel and said first of said pair of body side panels combine to form a first recessed channel along opposite sides of an attachment seam defined between the roof panel and said first of said pair of body side panels, said roof panel and said second of said pair of body side panels combine to form a second recessed channel along opposite sides of an attachment seam defined between the roof panel and said second of said pair of body side panels;
    a first elongated trim member received within said first recessed channel overlying a first portion of the attachment seam between said roof panel and said first of said pair of body side panels, a second elongated trim member received within said second recessed channel overlying a first portion of the attachment seam between said roof panel and said second of said pair of body side panels; and
    wherein a second portion of said connection seam between said roof panel and said first of said body side panels is covered by a window frame of a side door of the vehicle.

5. The passenger vehicle according to claim 4, wherein said elongated trim members include a guide channel for mounting a roof rack bracket.

* * * * *